United States Patent
Arndt et al.

(10) Patent No.: US 9,043,710 B2
(45) Date of Patent: May 26, 2015

(54) SWITCH CONTROL IN REPORT GENERATION

(75) Inventors: Henrik Arndt, Frankfurt (DE); Christian Frankenberg, Neulussheim (DE)

(73) Assignee: SAP SE, Walldorf (DE)

( * ) Notice: Subject to any disclaimer, the term of this patent is extended or adjusted under 35 U.S.C. 154(b) by 112 days.

(21) Appl. No.: 13/456,773

(22) Filed: Apr. 26, 2012

(65) Prior Publication Data

US 2013/0290825 A1 Oct. 31, 2013

(51) Int. Cl.
G06F 17/00 (2006.01)
G06F 17/30 (2006.01)
G06Q 10/10 (2012.01)

(52) U.S. Cl.
CPC .......... *G06Q 10/10* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 2005/0004947 A1* | 1/2005 | Emlet et al. | 707/104.1 |
| 2005/0086207 A1* | 4/2005 | Heuer et al. | 707/3 |
| 2008/0005677 A1 | 1/2008 | Thompson | |
| 2012/0079363 A1* | 3/2012 | Folting et al. | 715/227 |

OTHER PUBLICATIONS

"Account Collaboration Data"—Report opened by key user in Business Analytics work center—Windows Internet Explorer, Jul. 2009, 1pg.
"Settings", SAP Business ByDesign Library—Windows Internet Explorer, Jul. 2009, 1pg.

* cited by examiner

*Primary Examiner* — Keith Bloomquist
(74) *Attorney, Agent, or Firm* — Buckley, Maschoff & Talwalkar LLC

(57) ABSTRACT

In one embodiment, a view in a graphical user interface includes a selection area that includes identifiers associated with a plurality of attributes, each of the attributes having a plurality of possible values. The area further includes one or more graphical tools to define filter criteria based at least in part on selected ones of the plurality of possible values of one or more of the attributes. The area further includes one or more switch controls each being associated with a respective one of the one or more of the attributes and indicating presentation criteria including: whether selected ones of the possible values of the respective attribute are to be shown in a report, and a dimension of the report in which to space the selected ones of the possible values from one another if the selected ones of the possible values are to be shown in the report.

18 Claims, 11 Drawing Sheets

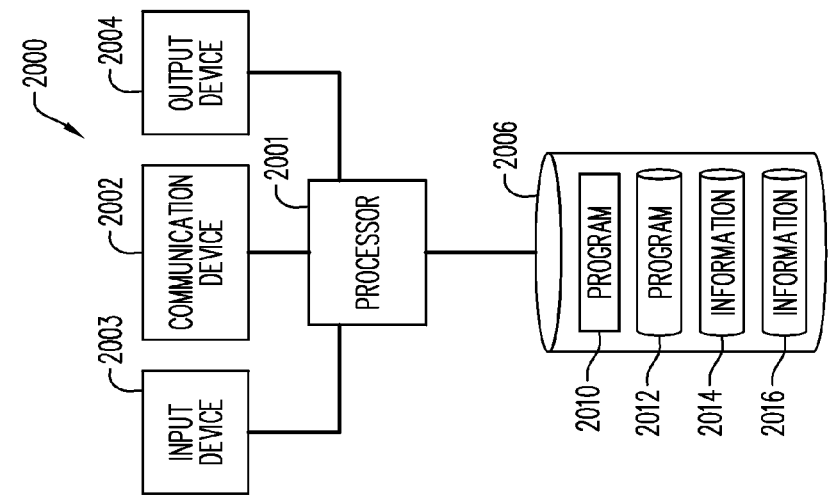
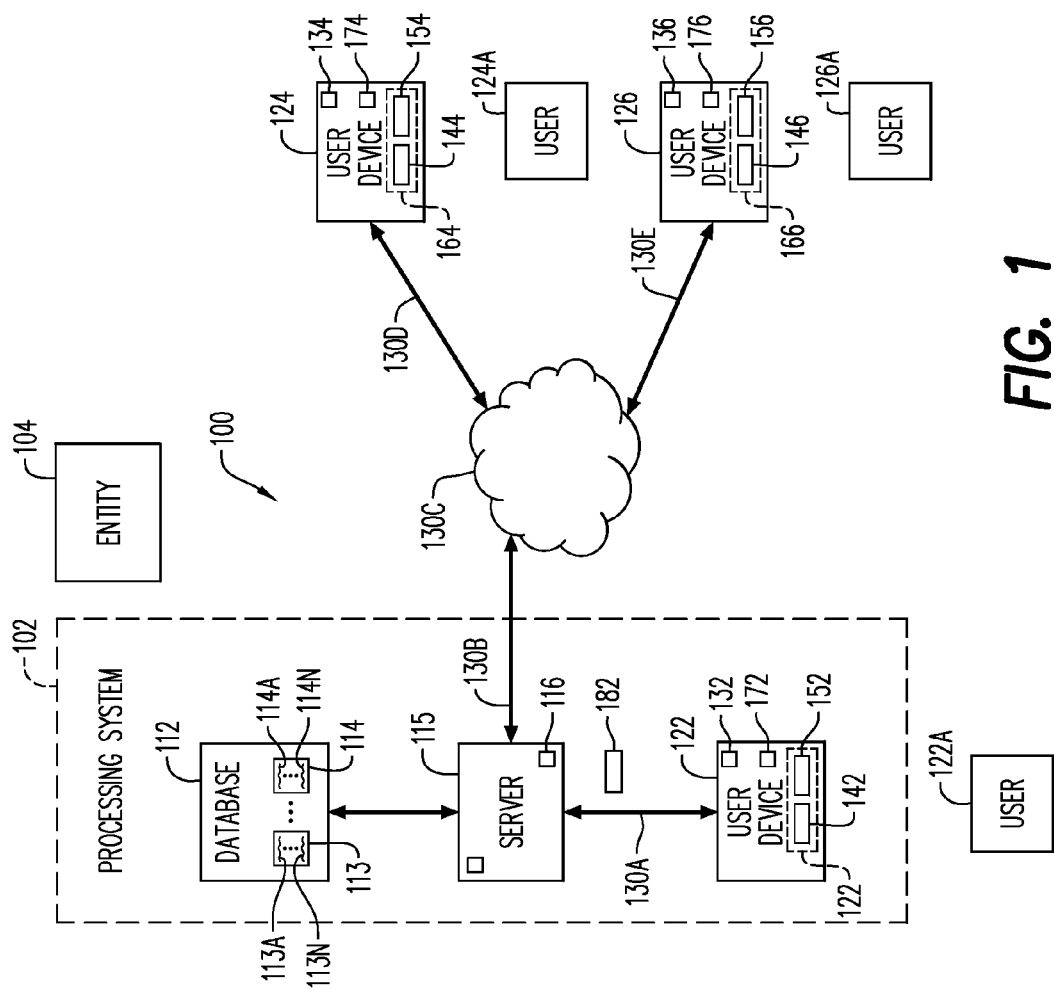

FIG. 3

SELECTIONS [x]

| EDIT SELECTION | EDIT FILTER | MANAGE |

▼ SELECTION: INITIAL

- SUPPLIER: [                    ]
- SUPPLIER COUNTRY: [DE; CH; GB]
- PRODUCT: [M DECF-0001 (AHT COMBI 75);]
- PRODUCT CATEGORY: [                    ]
- ▶ ALL AVAILABLE
- INVOICE YEAR/MONTH: [11.2010...01.2011]  — 245
- COMPANY: [GCFR10000;MDEC10000;GCG]  — 265
- PURCHASING UNIT: [                    ]
- INVOICING UNIT: [                    ]

[GO] [SAVE] [SAVE AS]

206

VISUALIZATION ≡

| INVOICE YEAR/MONTH | NOVEMBER 2010 | DECEMBER 2010 | JANUARY 2011 |
|---|---|---|---|
| SUPPLIER COUNTRY | NET VALUE | NET VALUE | NET VALUE |
| SWITZERLAND |  |  | 395.00 USD |
| GERMANY | 158.00 USD | -6.00 USD | 158.75 USD |
| UNITED KINGDOM | 2,779.85 USD | 2,634.86 USD | 11,431.06 USD |
| RESULT | 2,937.85 USD | 2,628.86 USD | 11,984.82 USD |

CHARACTERISTICS
- CURRENCY
- INVOICE ID
- INVOICE ITEM
- INVOICE YEAR
- INVOICE YEAR/MONTH — 264
- INVOICE YEAR/QUARTER
- PRODUCT
- PURCHASING UNIT — 261
- SUPPLIER COUNTRY

SELECTIONS [x]

| EDIT SELECTION | EDIT FILTER | MANAGE |

▼ SELECTION: INITIAL

- SUPPLIER: [                    ]
- SUPPLIER COUNTRY: [DE; CH; GB]  — 262
- PRODUCT: [M DECF-0001 (AHT COMBI 75);]  — 242
- PRODUCT CATEGORY: [                    ]
- ▶ ALL AVAILABLE
- INVOICE YEAR/MONTH: [11.2010...01.2011]  — 245
- COMPANY: [GCFR10000;MDEC10000;GCG]  — 265
- PURCHASING UNIT: [                    ]
- INVOICING UNIT: [                    ]

[GO] [SAVE] [SAVE AS]

206

VISUALIZATION ≡  — 481

| SUPPLIER COUNTRY | PRODUCT | INVOICE YEAR/MONTH | NOVEMBER 2010 | DECEMBER 2010 | JANUARY 2011 |
|---|---|---|---|---|---|
|  |  |  | NET VALUE | NET VALUE | NET VALUE |
| SWITZERLAND | MDECF-0001 | AHT COMBI 75 |  |  | 395.00 USD |
| GERMANY | GCFRD-0001 | MARKETING STRATEGY |  | -6.00 USD |  |
|  | GCFRF-0012 | AHT COMBI 75 |  |  | 126.40 USD |
|  | GCGBR-0004 | T-IRON |  |  | 32.35 USD |
|  | MDECF-0001 | AHT COMBI 75 | 158.00 USD |  | 0.00 USD |
| UNITED KINGDOM | GCFRR-0004 | T-IRON | 562.94 USD | 776.76 USD | 8,459.00 USD |
|  | GCFRR-0005 | GREY CAST IRON CYLINDER |  | 260.70 USD |  |
|  | GCGBF-0001 | AHT COMBI 75 | 2,058.82 USD |  |  |
|  | GCGBF-0004 | AHT COMBI MAX |  | 17.65 USD |  |
|  | GCGBR-0004 | T-IRON | 29.41 USD | 61.78 USD | 2,089.71 USD |
|  | GCGBW-0001 | CONSTRUCTION SERVICES |  | 1,470.59 USD | 882.35 USD |
|  | MCR-0005 | GREY CAST IRON CYLINDER | 128.68 USD |  |  |
|  | MDECF-0001 | AHT COMBI 75 |  | 47.40 USD |  |
| RESULT |  |  | 2,937.85 USD | 2,628.86 USD | 11,984.82 USD |

SWITCH CONTROL IN REPORT GENERATION

BACKGROUND

Businesses and/or other types of entities often collect and/or use data in the course of their operations. The data collected and/or used by an entity is often stored in one or more databases, which may be part of a processing system operated by, and/or on behalf of, the entity.

One or more users (e.g., employees) will often require a table, chart and/or other type of report showing one or more portions of the data stored in the one or more databases.

The report may be generated and supplied to one or more devices, such as for example, a printer or a display of a computer or other device operated by one or more users and coupled, directly or indirectly, to the processing system.

BRIEF DESCRIPTION OF THE DRAWINGS

FIG. 1 is a block diagram of a system according to some embodiments.

FIGS. 3-5 are views in a user interface, in accordance with some embodiments.

FIG. 14B is a representation of a portion of a view, in accordance with some embodiments.

FIG. 20 is a block diagram of a processing system, in accordance with some embodiments.

FIG. 21 is a portion of a view in a user interface, in accordance with some embodiments.

DETAILED DESCRIPTION

Figure 2:
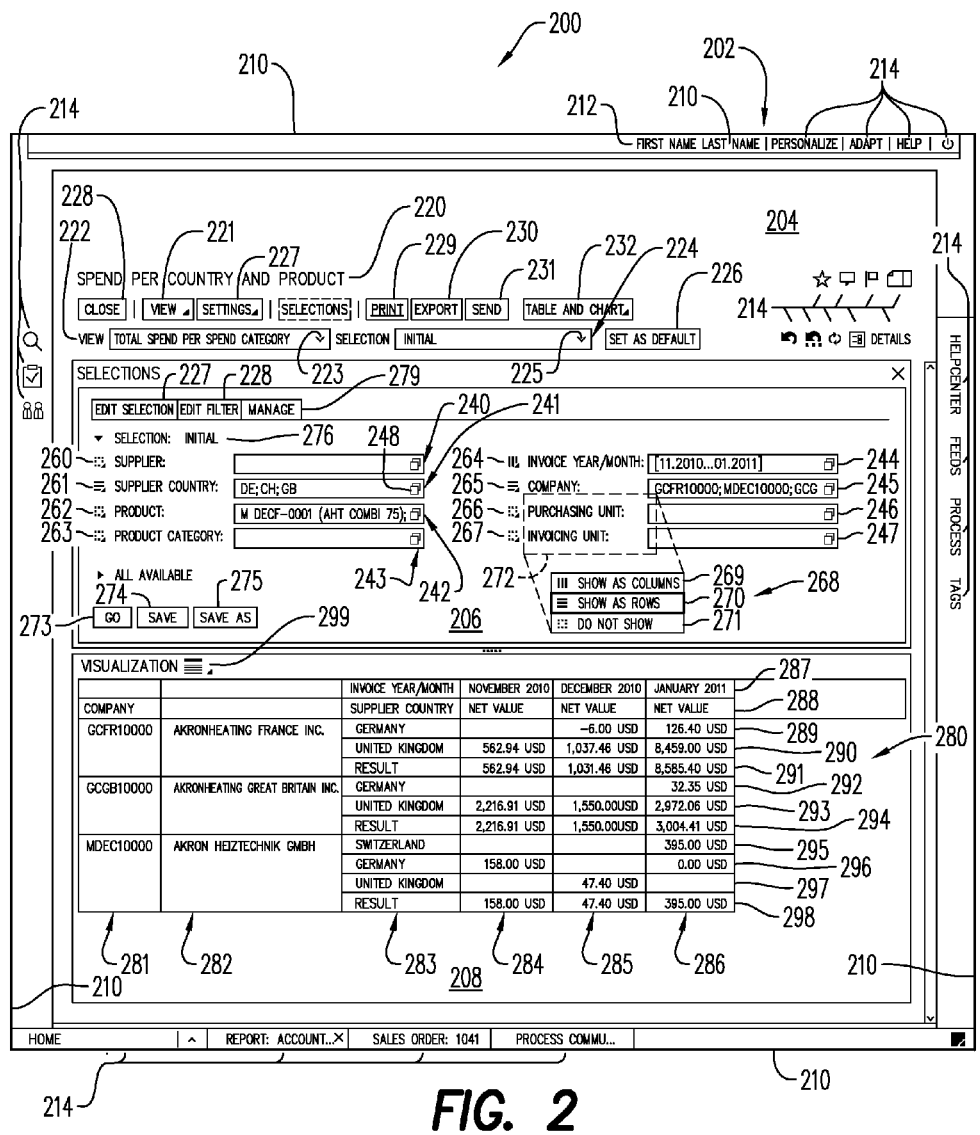
FIG. 2 is a view in a user interface, in accordance with some embodiments.

FIG. 1 is a block diagram of a system 100 that may be used in association with retrieving data and/or generating a report showing such data, in accordance with some embodiments. Referring to FIG. 1, the system 100 may include a processing system 102 that is operated by, and/or on behalf of, an entity 104, e.g., a business. The processing system 102 may include a database 112 and a server 115. The database 112 may store data collected and/or used by the entity 104. The data may include multidimensional data and may be stored as a plurality of records, e.g., 113-114. The server 115 may include one or more processors, e.g., 116, and may be coupled to and/or in communication with the database 112.

The system 100 may further include a plurality of devices, e.g., 122-126, which may be operated by a plurality of users, e.g., 122A-126A. One or more of such devices (sometimes referred to herein as user devices) may comprise a desktop computer. Others of the user devices may comprise a laptop computer, a smart phone, and/or any other type of user device. One or more of the user devices may be coupled to the server 115 via one or more communication links, e.g., 130A-130E.

Each of the user devices 122-126 may include a processing system that includes one or more processors, e.g., processors 132-136, respectively, one or more input devices, e.g., 142-146, respectively, and one or more output devices, e.g., 152-156, respectively. The one or more processors, e.g., 132-136, may communicate with the input devices 142-146, respectively, and/or with the display devices 152-156, respectively, to provide user interfaces 162-166, respectively. In some embodiments, the one or more processors execute one or more programs, e.g., 172-176, respectively, which may be stored in and/or downloaded to the user devices 122-126, respectively.

Each of the records stored in the database may include categories of data, e.g., 113A-113N and 114A-114N, respectively. For example, one or more of the records in the database, e.g., record 113, may represent an invoice for a product that is purchased by a company from a supplier on a given date. The record 113 may include data relating to the following categories: (i) supplier, (ii) supplier country, i.e., country in which the supplier is located, (iii) product, (iv) product category, i.e., category to which the product belongs, (v) year and month of the invoice, (vi) company, (vi) purchasing unit, i.e., unit (of the company) that purchased the product and (vii) invoicing unit, i.e., unit (of the supplier) that created the invoice.

The different categories and the data in such categories are just some examples of what is referred to herein as attributes and values of attributes, respectfully. It should be understood that the terms attributes and values of attributes are not limited to such categories and data in such categories.

FIG. 2 is a view 200 in a graphical user interface that may be provided (e.g., by a user devices 122-126 in the system 100) to a user and used in association with retrieving data that satisfies certain criteria and/or generating a report showing the data, in accordance with some embodiments.

Referring to FIG. 2, the view 200 may include a plurality of regions 202-208. One of the regions 202 may include a border 210 as well as general information 212 and/or graphical tools 214 (which may or may not directly relate to generating a report).

The region 206, which is sometimes referred to herein as a selection section 206, may include one or more graphical tools that allow the user to define filter criteria, which in turn may be used to identify the data to be used in the report. In some embodiments, the filter criteria is in the form of a list of attributes, and a set of values for each attribute that define filter criteria for that attribute. To that effect, the selection section 206 may include one or more graphical tools, e.g., graphical tools 240-247, each of which is associated with and includes a name (or other type of identifier) of a respective attribute (e.g., SUPPLIER, SUPPLIER COUNTRY, etc.) and a value selection field to allow a user to select a set of values that will define the filter criteria for that attribute. For example, a first one of the graphical tools 240 may be associated with and may include the name of a respective attribute, e.g., SUPPLIER, and a value selection field to allow a user to select a set of values that will define the filter criteria for that attribute. And so on. If a value selection field for an attribute is empty, that attribute may have no filter criteria.

Figure 11:
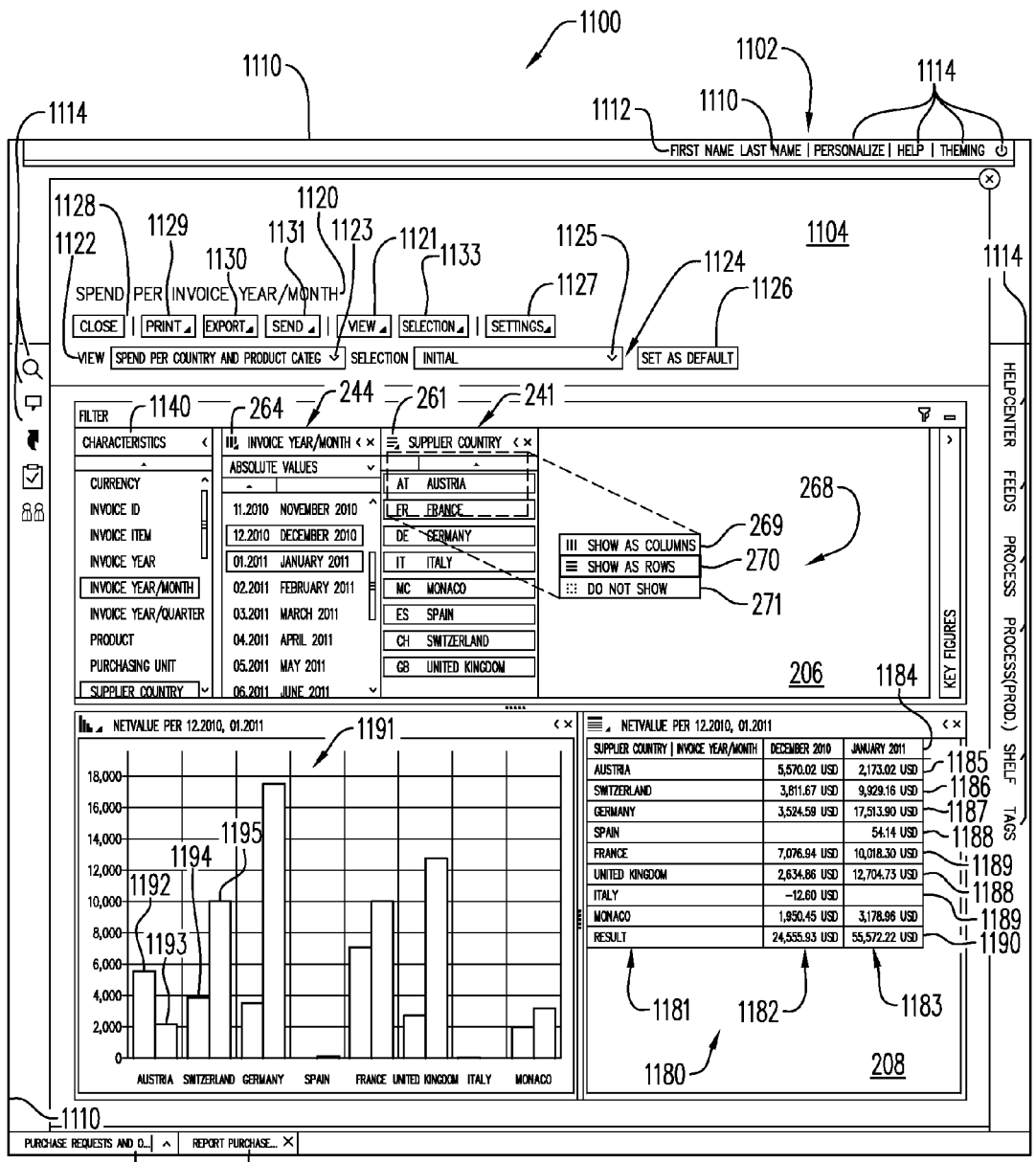
FIGS. 11-12 are portions of views in a user interface, in accordance with some embodiments.

To assist a user with providing a selected set of values in the value selection fields, each of the graphical tools 240-247, e.g., tool 241, may include a tool, e.g., tool 248, that may be activated by a user to open a pop up that shows a list of all possible values (in the system) for the respective attribute. One embodiment of such a list for the attribute SUPPLIER COUNTRY is shown in FIG. 11. With the pop up open, the user may select (or deselect) one or more of the values in the list to define the set of values for the filter criteria. An okay button (not shown) may be activated to close the pop up.

View 200 shows values DE, CH and GB in value selection field for attribute SUPPLIER COUNTRY, values M DECF-0001 (AHT COMBI 75) in value selection field for attribute PRODUCT, a range of 11.2010 to 01.2011 (i.e., 11/2010 to 1/2011) in value selection fields for attribute INVOICE YEAR/MONTH and values GCFR10000, MDEC10000, GCGB10000 in value selection field for attribute COMPANY.

To satisfy such filter criteria, a record must have a value of DE, CH or GB for the attribute SUPPLIER COUNTRY, a value of M DECF-0001 (AHT COMBI 75) for the attribute PRODUCT, a value in a range from 11.2010 to 01.2011 (i.e., 11/2010 to 1/2011) for the attribute INVOICE YEAR/MONTH and a value of GCFR10000, MDEC10000 or GCGB 10000 for the attribute COMPANY.

In some embodiments one or more of the graphical tools, e.g., one or more of graphical tools 240-247, may include one or more other types of selection assistant. Thus, in some embodiments one or more of the graphical tools, e.g., one or more of graphical tools 240-247, may include a tool (which may have a visible appearance that is identical to the tool 248) that may be activated by a user to open a pop up that assists a user but does not show a list of all possible values as in FIG. 11. In that regard, in some embodiments, one or more of the graphical tools, e.g., tool 241, for an attribute, e.g., SUPPLIER COUNTRY, may be activated by a user to open a pop up that shows an interactive map that allows a user to select (or deselect) one or more countries and/or one or more regions that are possible values of the attribute, e.g., SUPPLIER COUNTRY. In some embodiments, one or more of the graphical tools, e.g., tool 244, for an attribute, e.g., INVOICE YEAR/MONTH, may be activated by a user to open a pop up that shows an interactive calendar that allows a user to select (or deselect) one or more dates and/or one or more date ranges that are possible values of the attribute, e.g., INVOICE YEAR/MONTH. In some embodiments, one or more of the graphical tools, e.g., tools 240, 242-243, 245, for an attribute, e.g., SUPPLIER, PRODUCT, PRODUCT CATEGORY, COMPANY, respectively, may be activated by a user to open a pop up that allows a user to select (or deselect) one or more possible values of the attribute, e.g., SUPPLIER, PRODUCT, PRODUCT CATEGORY, COMPANY, respectively, by selecting and/or otherwise defining one or more rules. In some embodiments, the values of the attribute that are selected by selecting and/or otherwise defining one or more rules are ones of the possible values of the attribute that satisfy all of the rules that have been selected and/or otherwise defined for the attribute.

Figure 21:
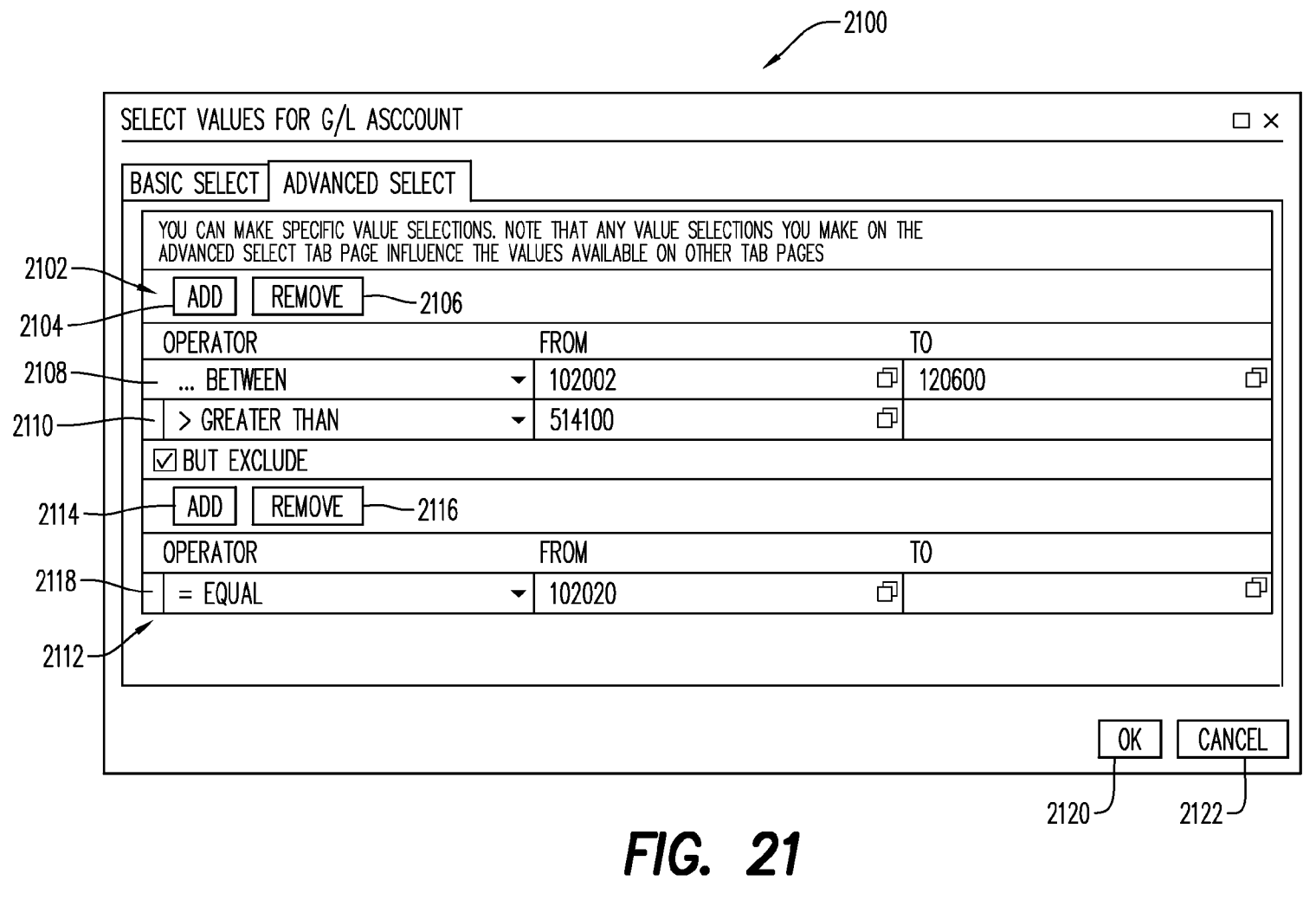

One embodiment of such a pop up is shown in FIG. 21. Referring to FIG. 21, in accordance with some embodiments, a pop up 2100 allows a user to select (or deselect) one or more possible values of an attribute, e.g., G/L ACCOUNT, by selecting and/or otherwise defining one or more rules. The pop up 2100 may include a first section 2102, which may include tools 2104, 2106, which may be activated by a user to request that a rule be added or removed, respectively. The first section 2102 may further include one or more rules, e.g., rules 2108, 2110, that have already been selected and/or otherwise defined by the user with the assistance of the pop up. In the illustrated embodiment, a first rule 2108 specifies an operation, i.e., "between", and a range, i.e., from 102002 to 120500. A second rule 2110 specifies an operation, i.e., "greater than", and a range, i.e., from 102020. In some embodiments, the values of the attribute, e.g., G/L ACCOUNT, that are selected by selecting and/or otherwise defining the rules 2108, 2110 are ones of the possible values of the attribute, e.g., G/L ACCOUNT, that satisfy all of the rules, e.g., rules 2108, 2110, that have been selected and/or otherwise defined for the attribute, e.g., G/L ACCOUNT.

The pop up 2100 may further include a second section 2112. The second section 2112 may be used to deselect one or more of the values of the attribute, e.g., G/L ACCOUNT, that are selected by the rules in the first section 2102. The second section 2112 may include tools 2114, 2116, which may be activated by a user to request that a rule be added or removed, respectively, from the second section 2112. The second section 2112 may further include one or more rules, e.g., rule 2118, that has already been selected and/or otherwise defined by the user with the assistance of the pop up. In the illustrated embodiment, a rule 2118 specifies an operation, i.e., "equal", and a range, i.e., 102002. In some embodiments, the values of the attribute, e.g., G/L ACCOUNT, that are deselected by selecting and/or otherwise defining the one or more rules, e.g., rule 2118, in the second section 2112 are ones of the possible values of the attribute, e.g., G/L ACCOUNT, that satisfy the one or more rules, e.g., rule 2118, in the second section 2112. Thus, in the illustrated embodiment, the values of the attribute, e.g., G/L ACCOUNT, that are selected by selecting and/or otherwise defining the rules 2108, 2110, 2118 are ones of the possible values of the attribute, e.g., G/L ACCOUNT, that satisfy the rules, e.g., rules 2108, 2110 and 2118 (i.e., not deselected by the deselection rule) that have been selected and/or otherwise defined for the attribute, e.g., G/L ACCOUNT.

A button 2120 may be activated to close the pop up 2100 and/or store any changes that have been made since the pop up 2100 was last opened. A button 2122 may be activated to close the pop up 2100 without storing any changes that have been made since the pop up 2100 was last opened.

In some embodiments, one or more of the selected and/or other possible values of an attribute may have and may be displayed (e.g., in the selection section 206 and/or in a report) in more than one form. For example, one of the selected values for the attribute COMPANY may have and may be displayed in a code form (e.g., GCR10000), a name form (e.g., AKRON HEATING FRANCE INC.) and/or an image form (e.g., a company logo for AKRON HEATING FRANCE INC.). Another of the selected values for the attribute COMPANY may have and may be displayed in a code form (e.g., MDEC10000), a name form (e.g., AKRON HEIZTECHNIK GMBH) and/or an image form (e.g., a company logo for AKRON HEIZTECHNIK GMBH). Another of the selected values for the attribute COMPANY may have and may be displayed in a code form (e.g., GCGB10000), a name form (e.g., AKRON HEATING GREAT BRITAIN INC.) and/or an image form (e.g., a company logo for AKRON HEATING GREAT BRITAIN INC.).

And so on.

A graphical tool 276 may indicate a name given to the current filter criteria (sometimes referred to herein as filter criteria settings).

As stated above, the selection section 206 may also allow the user to define presentation criteria that defines how data that satisfies the filter criteria is to be presented in a report. To that effect, the selection section 206 further includes one or more switch controls, e.g., switch controls 260-267, each of which may be associated with a respective one of the attributes and allow a user to indicate whether the values that were selected as the filter criteria for the respective attribute are to be shown in the report, and if so, how.

For example, a first one of the switch controls 260 may be associated with a respective attribute, e.g., SUPPLIER, and may allow a user to indicate whether the values that were selected as the filter criteria for the respective attribute are to be shown in the report, and if so, how. And so on. In some embodiments, each switch control allows a user to indicate whether the selected values for the respective attribute are to be shown as columns, shown as rows, or not shown at all.

In the illustrated embodiment, each switch control 260-267 comprises a tri-state switch having three possible states, where each state is associated with particular presentation criteria. The first state may be associated with the presentation criteria (and is sometimes referred to herein as) "show as columns". The second state may be associated with the presentation criteria (and is sometimes referred to as) "show as rows". The third state may be associated with the presentation criteria (and is sometimes referred to as) "do not show". If the switch is in the first state, values for the respective attribute are to be shown in a report as columns. If the switch is in the second state, values for the respective attribute are to be shown in a report as rows. If the switch is in the third state, values for the respective attribute are not to be shown in the report.

Each switch control 260-267 displays a symbol that is associated with and indicates its current state. A symbol associated with the state "show as columns" may be three vertical lines. A symbol associated with the state "show as rows" may be three horizontal lines. A symbol associated with the state "do not show" may be a plurality of dots.

In some embodiments, each switch control may allow a user to change its state by performing a mouse click or other action on the switch control. In such embodiments, a first mouse click may cause the switch control to transition from an initial state. A second mouse click may cause the switch control to transition again. A third mouse click may cause the switch control to transition again, returning the switch control to the initial state.

In some other embodiments, each switch control may be activated (by a user) to open a pop up, e.g., pop up 268, that shows a list of all possible states, e.g., a first state 269 (SHOW AS COLUMNS), a second state 270 (SHOW AS ROWS), and a third state 271 (DO NOT SHOW). If the switch control 265 is activated, the pop up may be located at a position 272. With the pop up open the user may select one of the possible states. After a user selects one of the states, the switch control may transition to the selected state and the pop up may close automatically.

In some embodiments, each of the switch controls 260-267 is located adjacent to a name (or other identifier) of the attribute with which the switch control is associated.

Using the convention described above for the illustrated embodiment, switch control 261 indicates that the selected values for respective attribute, e.g., SUPPLIER COUNTRY, should be shown as rows. Switch control 264 indicates that the selected values for respective attribute, e.g., INVOICE YEAR/MONTH, should be shown as columns. Switch control 265 indicates that the selected values for the respective attribute, e.g., COMPANY, should be shown as rows. Switch controls 260, 262-263, 266-267 indicate that selected values for the other attributes should not be shown.

The region 208 (sometimes referred to herein as visualization section 208) may show a report based at least in part on data that satisfies the filter criteria and the presentation criteria indicated by the plurality of switch controls. In some embodiments, the report comprises a table 280 having a plurality of columns, e.g., columns 281-286, each of which may have one or more rows. In the illustrated embodiment, columns 281-282 each have five rows. The others columns each have twelve rows, e.g., rows 287-298.

In accordance with the presentation criteria indicated by the switch controls 260-267, the selected values of the attribute SUPPLIER COUNTRY are shown as rows. The selected values of the attribute INVOICE YEAR/MONTH are shown as columns. The selected values of the attribute COMPANY are shown as rows.

In table 280, the selected values of the attribute COMPANY, which are shown as rows, have been given priority over the selected values of the attribute SUPPLIER COUNTRY, which are also shown as rows. In some embodiments, the selected values of the attribute SUPPLIER COUNTRY are shown to the left and/or only once, while the selected values of the attribute COMPANY are shown to the right and/or cycled (shown multiple times). As will be further described below with respect to FIGS. 15-16, in some embodiments, priority may be determined based at least in part, on an arrangement within the selection section 206. In some embodiments, a user of the graphical user interface may adjust this priority in some way.

As stated above, in some embodiments, one or more of the selected and/or other possible values of an attribute may have and may be displayed (e.g., in the selection section 206 and/or in a report) in more than one form.

The form of a value that is displayed in the selection section 206 may or may not be the same as the form of the value that is displayed in a report and/or the visualization section 208. Thus, in some embodiments, the form of a value that is displayed in the selection section 206 is the same as the form of the value that is displayed in a report and/or the visualization section 208. In some embodiments, the form of a value that is displayed in the selection section 206 is different than the form of the value that is displayed in a report and/or the visualization section 208.

In some embodiments, multiple forms of a value are displayed in a report and/or in the visualization section 208. In the illustrated embodiment, the code form of the selected values of the attribute COMPANY and the name form of the selected values of the attribute COMPANY are each displayed in the report.

In some embodiments, the table further includes one or more result rows, e.g., rows 291, 294, 298, where each result row includes one or more entries, each of which represents a total of one or more relevant entries above it. In the illustrated embodiment, the table includes a plurality of result rows, e.g., rows 291, 294, 298, each of which is associated with a respective one of the selected values of the attribute COMPANY. Each of the result rows 291, 294, 298 includes a plurality of entries each of which represents a total of the relevant entries above it (e.g., the entries for the associated one of the selected values of the attribute COMPANY as broken out according to the selected values of the attribute INVOICE YEAR/MONTH). Thus, the first result row 291 is associated with a first selected value (e.g., GCFR10000, AKRON HEATING FRANCE INC.) of the attribute COMPANY and includes a plurality of entries, each of which represents a total of the relevant entries above it, the first entry showing a total of results for the associated first value (e.g., GCFR10000, AKRON HEATING FRANCE INC.) of the attribute COMPANY for the first of the selected values of the attribute INVOICE YEAR/MONTH (e.g., NOVEMBER 2010), the second entry showing a total of results for the associated first value (e.g., GCFR10000, AKRON HEATING FRANCE INC.) of the attribute COMPANY for the second of the selected values of the attribute INVOICE YEAR/MONTH (e.g., DECEMBER 2010), and so on.

In some embodiments, the table 280 (or other type of visualization) may be converted to another type of visualization by activating a graphical tool 299.

The presentation criteria may include criteria in addition to that described above. In some embodiments the presentation criteria includes criteria indicating whether one or more result rows, e.g., e.g., rows 291, 294, 298, are to be included in the table (or other visualization). In some embodiments, the presentation criteria includes criteria indicating which form(s) of a value of an attribute should be shown in a report if such value of the attribute is to be shown in the report. In some embodiments, the presentation criteria includes criteria indicating the level of hierarchy to be shown in a report.

The region 204 may include a name 220 of a type of report (e.g., SPEND PER COUNTRY AND PRODUCT) that the user interface is capable of generating and one or more graphical tools, e.g., graphical tool 221 (e.g., VIEW) that may be activated to indicate (i) whether to include result row(s) in the report, and if so, criteria for determining the result(s) to be shown in the result row(s) (ii) for one or more of the attributes, the form or forms of value(s) of the attribute that is/are to be shown in a report if the value(s) of the attribute is/are to be shown in a report and (iii) a request to store the presentation criteria for later retrieval.

The region 204 may further include a graphical tool 227 (e.g., SETTINGS) that may be activated to indicate how data that is used in a visualization is obtained from a backend data source (and/or other type of database) and/or to indicate a frequency at that the data that is used in a visualization is refreshed based on the backend data source (and/or other type of database), a graphical tool 228 (e.g., CLOSE) that may be activated to close a current session and/or a file, a graphical tool 229 (e.g., PRINT) that may be activated to request that a visualization be sent to and/or printed by a printer, a graphical tool 230 (e.g., EXPORT) that may be activated to request that a visualization be exported, a graphical tool 231 (e.g., SEND) that may be activated to request that a visualization be sent, and a graphical tool 232 (e.g., TABLE AND CHART) that may be activated to indicate whether a visualization or visualizations in the visualization section 208 should be in the form of a table or chart or both. Graphical tools 222-223 (e.g., VIEW) may be activated to select a set of presentation criteria settings that has been saved by the user (e.g., using the graphical tool 221) or has been delivered as a predefined set. Graphical tools 224-225 (e.g., SELECTION) may be activated to select predefined filter criteria (e.g., a list of attributes, the order (and/or arrangement) of the attributes within the selection section 206) and their filter settings that have been saved by the user or have been delivered as a predefined set. Graphical tool 226 (e.g., SET AS DEFAULT) may be activated to request that a particular combination of view and selection be a default.

Although FIG. 2 shows separate tools for saving and selecting the presentation criteria and the filter criteria ((e.g., a list of attributes, the order (and/or arrangement) of the attributes within the selection section 206) and their filter settings), they could also be saved and selected in combination with one another.

FIG. 3 is a portion of a view 300 in a graphical user interface, which may be provided after a change to the presentation criteria shown in the view 200. The state of switch control 265 is now "do not show". A new table 380, which may have a plurality of columns, e.g., columns 381-384, each of which may include a plurality of rows, no longer shows the values of the respective attribute, e.g., COMPANY.

FIG. 4 is a portion of a view 400 in a graphical user interface, which may be provided after a change to the presentation criteria shown in the view 300. The state of switch control 262 is now "show as rows". A new table 480, which may have a plurality of columns, e.g., columns 481-486, each of which may include a plurality of rows, shows the values of the respective attribute, e.g., PRODUCT, as rows.

Figure 5:
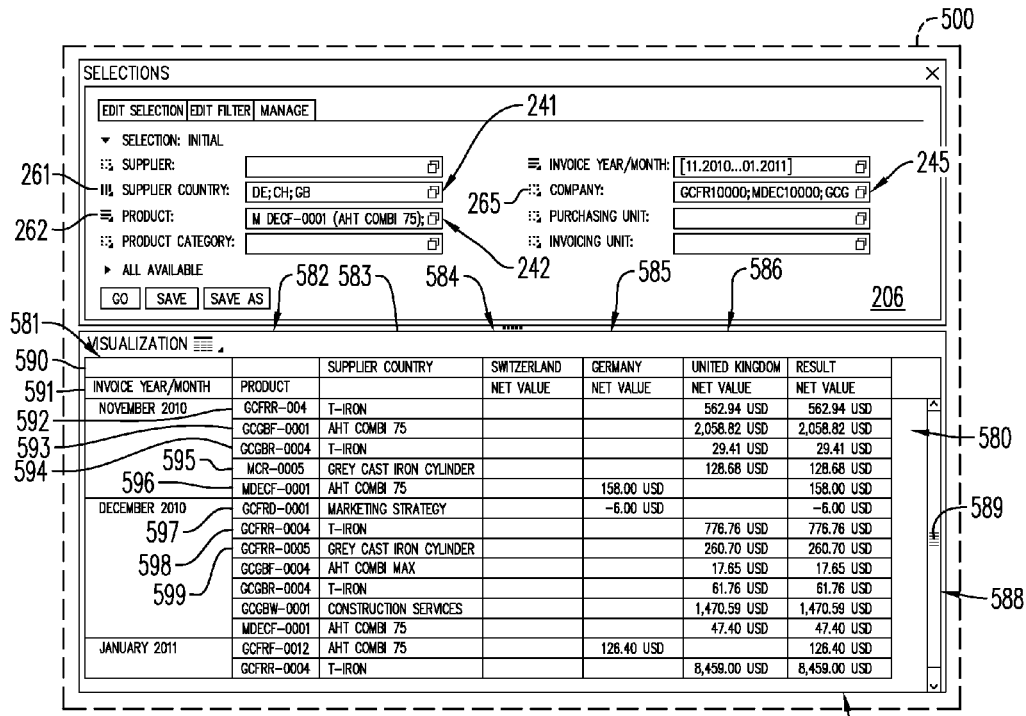

FIG. 5 is a portion of a view 500 in a graphical user interface, which may be provided after a change to the presentation criteria shown in the view 400. The state of the switch control 261 associated with the attribute SUPPLIER COUNTRY is now "show as columns". The state of the switch control associated with the attribute INVOICE YEAR/MONTH is now "show as rows". A new table 580, which may have a plurality of columns, e.g., columns 581-586, and rows, e.g., rows 590-599, shows the values of the attribute, e.g., SUPPLIER COUNTRY, as columns instead of rows and INVOICE YEAR/MONTH as rows instead of columns. A tool 588 may include a slider 589 to allow a user to scroll up/down.

It should be noted that presentation criteria is not limited to the criteria of "show as columns", "show as rows" and "do not show". Nor is the presentation criteria limited to criteria for tables having columns and rows. In accordance with some embodiments, the presentation criteria may be used in association with a report of any kind.

Figure 19A:
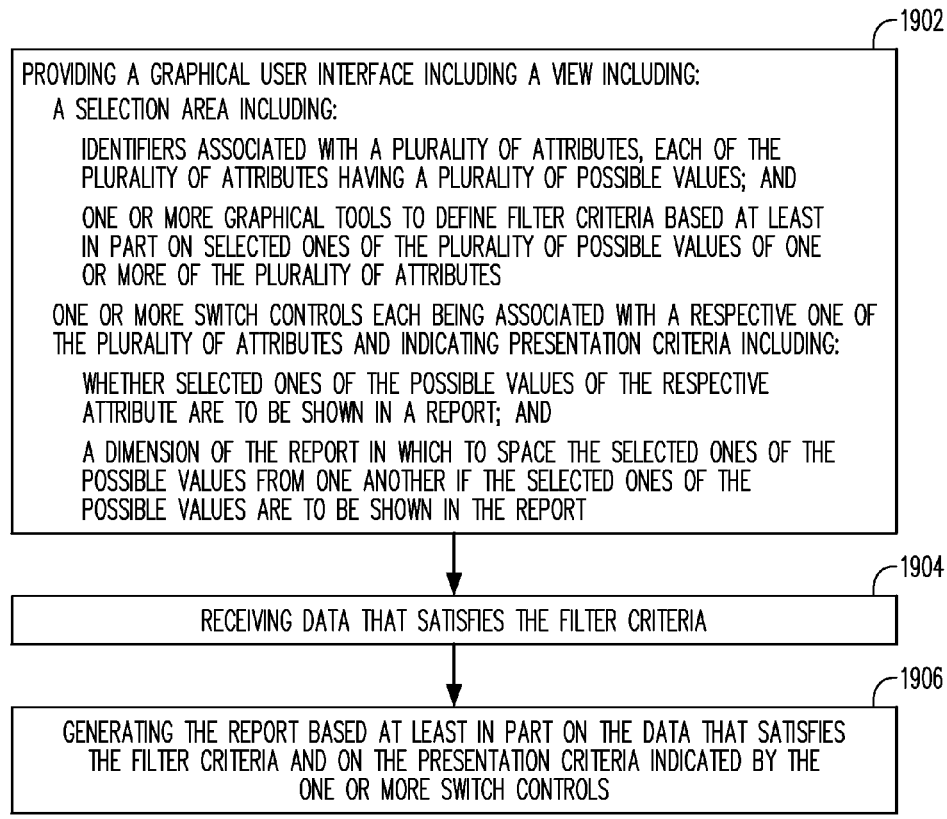
FIG. 19A is flow chart of a method, in accordance with some embodiments.
Figure 19B:
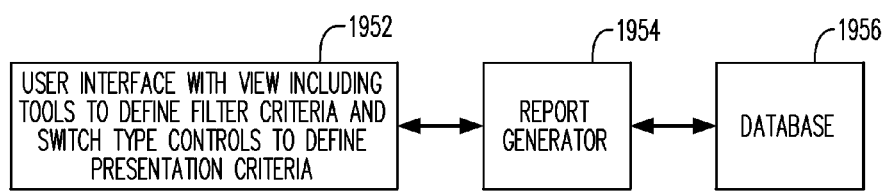
FIG. 19B is a block diagram of a portion of a processing system, in accordance with some embodiments.
Figure 19C:
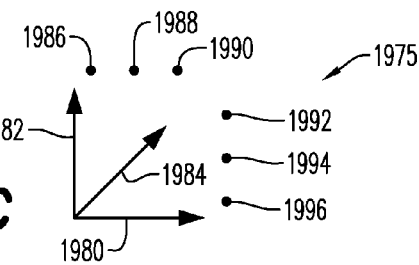
FIG. 19C is a representation of report, in accordance with some embodiments.

FIG. 19C is a schematic representation of a more generalized form of a report 1975, in accordance with some embodiments. The report 1975 may show data in one or more of a plurality of dimensions, e.g., 1980, 1982 and 1984.

In accordance with some embodiments, a switch control, e.g., switch control 260, may indicate presentation criteria including whether selected values of an attribute are to be shown in the report 1975 and a dimension of the report 1975 in which to space the selected values from one another if the selected values are to be shown in the report 1975.

In some embodiments, the switch control may indicate that selected values of an attribute should be spaced from one another in the dimension 1980. In such an embodiment, the report 1975 may space the selected values apart from one another in the dimension 1980, for example, but not limited to, along an axis in the report that extends in the dimension 1980. In accordance with some embodiments, circles 1986, 1988 and 1990 represent three selected values of an attribute that are spaced from one another in the dimension 1980. The circle 1986 represents a first selected value of the attribute that is located at a first position. The circle 1988 represents a second selected value of the attribute that is located at a second position. The circle 1990 represents a third selected value of the attribute that is located at a third position. The first selected value 1986 and the second selected value 1988 are spaced from one another in the dimension 1980. The second selected value 1986 and the third selected value 1988 are also spaced from one another in the dimension 1980. In some embodiments, the magnitude of the spacing between the first and second selected values 1986, 1988 may or may not be equal to the magnitude of the spacing between the second and third selected values 1988, 1990. In some embodiments, two or more of the selected values may also be spaced apart from one another in a dimension other than the dimension 1980.

In some embodiments, the switch control may indicate that selected values of an attribute should be spaced from one another in the dimension 1982. In such an embodiment, the report 1975 may space the selected values apart from one another in the dimension 1982, for example, but not limited to, along an axis in the report that extends in the dimension 1982. In accordance with some embodiments, circles 1992, 1994 and 1996 represent three selected values of an attribute that are spaced from one another in the dimension 1982. The circle 1992 represents a first selected value of the attribute that is located at a fourth position. The circle 1994 represents a second selected value of the attribute that is located at a fifth position. The circle 1996 represents a third selected value of the attribute that is located at a sixth position. The first selected value 1992 and the second selected value 1994 are spaced from one another in the dimension 1982. The second selected value 1992 and the third selected value 1994 are also spaced from one another in the dimension 1982. In some embodiments, the magnitude of the spacing between the first and second selected values 1992, 1994 may or may not be equal to the magnitude of the spacing between the second and third selected values 1994, 1996. In some embodiments, two or more of the selected values may also be spaced apart from one another in a dimension other than the dimension 1982.

In some embodiments, the switch control may indicate that selected values of an attribute should be spaced from one another in the dimension 1984. And so on.

It should be noted that the criteria "show as columns" and "show as rows" and "do not show" are embodiments of the above.

Figure 6:
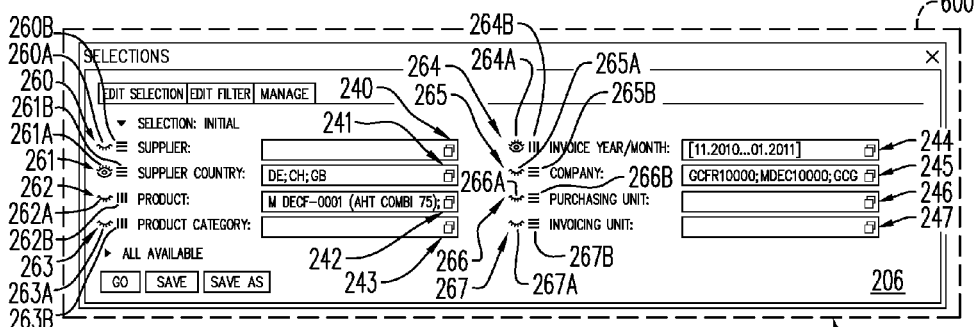
FIGS. 6-7 are portions of views in a user interface, in accordance with some embodiments.

FIG. 6 is a portion of a view 600 in a graphical user interface, showing a second embodiment of the switch controls 260-267, in accordance with some embodiments.

Referring to FIG. 6, in accordance with some embodiments, each of the switch controls 260-267 may include two switches. For example, a first switch control 260 may have switches 260A-260B. And so on.

As with the switch controls 260-267 in views 200-500, each of the switch controls 260-267 in view 600 allows a user to define whether the values for the respective attribute are to be shown in a report, and if so, how they are to be shown in the report.

In some embodiments, the first switch of each switch control allows the user to define whether or not values for the respective attribute are to be shown in a report. The second switch of each switch control may allow a user to define how values that are to be shown in a report are to be shown in the report, e.g., as columns or as rows.

In some embodiments, the first switch and the second switch each have two possible states, each of which may be associated with particular presentation criteria. The first state of the first switch may be associated with the presentation criteria (and sometimes referred to herein as) "show". The second state of the first switch may be associated with the presentation criteria (and sometimes referred to herein as) "do not show". The first state of the second switch may be associated with the presentation criteria (and sometimes referred to herein as) "show as columns". The second state of the second switch may be associated with the presentation criteria (and sometimes referred to herein as) "show as rows". With the above convention, if the first switch is in the first state and the second switch is in the second state, values for the respective attribute are to be shown in a report as columns. If the first switch is in the first state and the second switch is in the second state, values for the respective attribute are to be shown in a report as rows. If the first switch is in the second state, values for the respective attribute are not to be shown in the report.

Each switch of each switch control 260-267 displays a symbol that is associated with and indicates its current state. A symbol associated with the state "show", may be an open eye. A symbol associated with the state "do not show", may be a closed eye. A symbol associated with the state "show as columns" may be three vertical lines. A symbol associated with the state "show as rows" may be three horizontal lines.

In view of the convention described above, the switch control 261 indicates that the selected values for respective attribute, e.g., SUPPLIER COUNTRY, should be shown as rows. The switch control 264 indicates that the selected values for respective attribute, e.g., INVOICE YEAR/MONTH, should be shown as columns. The other switch controls 260, 262-263 and 265-267 indicate that the selected values for the other attributes should not be shown. Thus, the presentation criteria is identical to that shown in the view 300. A table or other visualization may be generated and presented in a visualization section that may be included (but is not shown) in the view 600. In some embodiments, such visualization section is identical to the visualization section 208 shown in the view 300.

In some embodiments, the second switch of each switch control is shown only if the first switch of the switch control indicates that values for the respective attribute are to be shown in a report. Thus, if as in the illustrated embodiment, the first switches 260A, 262A-263A and 265A-267A of switch controls 260, 262-263 and 265-267, respectively, indicate that values for the respective attributes, e.g., SUPPLIER, PRODUCT, PRODUCT CATEGORY, COMPANY, PURCHASING UNIT and INVOICING UNIT, should not be shown, then the second switches 260B, 262B-263B and 265B-267B of such switch controls 260, 262-263 and 265-267, respectfully, may not be shown.

In some embodiments, the second switch of each switch control is shown in an inactive state (e.g., grayed out) if the first switch of the switch control indicates that values for the respective attribute are not to be shown in a report. Thus, if as in the illustrated embodiment, the first switches 260A, 262A-263A and 265A-267A of switch controls 260, 262-263 and 265-267, respectively, indicate that values for the respective attributes, e.g., SUPPLIER, PRODUCT, PRODUCT CATEGORY, COMPANY, PURCHASING UNIT and INVOICING UNIT, should not be shown, then the second switches 260B, 262B-263B and 265B-267B of such switch controls 260, 262-263 and 265-267, respectfully, may be grayed out.

Figure 7:
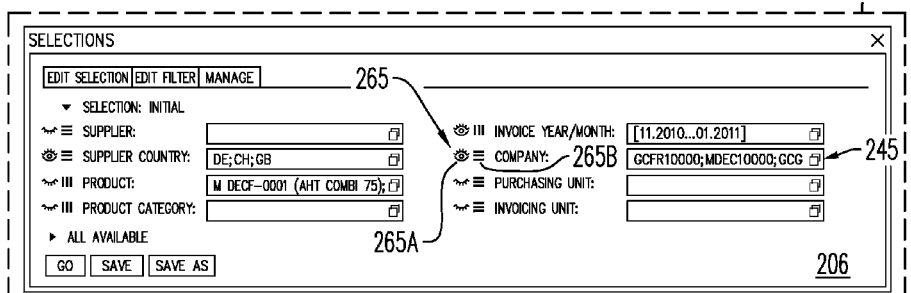

FIG. 7 is a portion of a view 700 in a graphical user interface, which may be provided after a change to the presentation criteria shown in the view 600. After the change (the state of switch control 265 is now "show as rows"), the presentation criteria is identical to that shown in the view 200. A new table may be presented in a visualization section that may be included (but is not shown) in the view 700. In some embodiments, such visualization section is identical to the visualization section 208 in the view 200.

Figure 8:
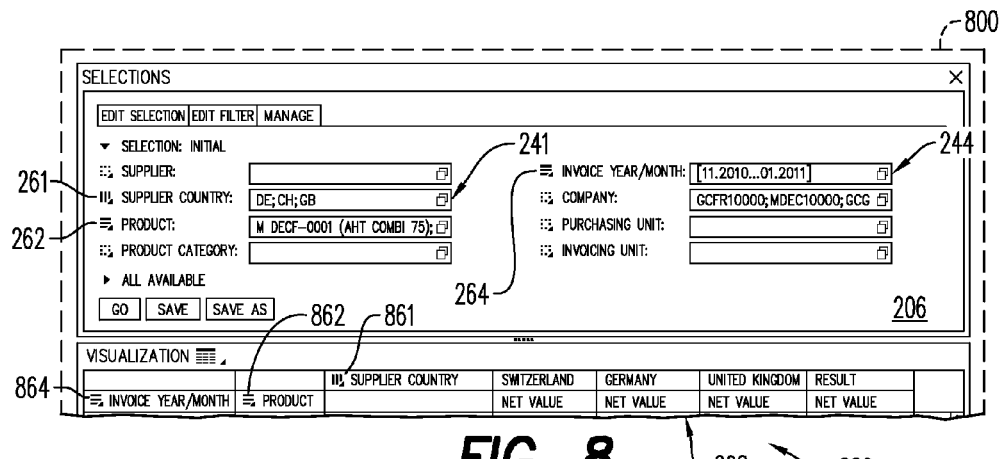
FIG. 8 is a portion of a view in a user interface, in accordance with some embodiments.

FIG. 8 is a portion of a view 800 in a graphical user interface, in accordance with some embodiments. The visualization section 208 may include one or more switch controls, e.g., 861, 862 and 864, each of which may be associated with a respective one of the attributes and may allow a user to change the presentation criteria for the respective attribute. Thus, a switch control 861 may be associated with a respective attribute, e.g., SUPPLIER COUNTRY, and may allow a user to change whether (and if so, how) the values that were selected as the filter criteria for the respective attribute are to be shown in the report (e.g., whether the values for the respective attribute are to be shown as columns, shown as rows, or not shown at all). And so on. In some embodiments, each of the one or more switch controls, e.g., 861, 862 and 864, may operate and/or may be operated in a manner that is the same and/or similar to the manner of operation of the switch controls, e.g., 260-267, in the view 200.

For example, if values for an attribute, e.g., SUPPLIER COUNTRY, are shown as columns, the respective switch control, e.g., 861, may allow the user to request that the values for the attribute instead be shown as rows or not at all. If values for the attribute are shown as rows, the respective switch control may allow the user to request that the values for the attribute instead be shown as columns or not at all.

In some embodiments, each of the one or more switch controls, e.g., 861, 862 and 864, in the visualization section 208 is disposed within a visualization of a report, e.g., a table 880 and/or other visualization, and is adjacent to the name of the respective attribute with which the switch control is associated. If a switch control in the visualization section 208 is used to change the presentation criteria associated with an attribute, the state of the corresponding switch control in the selection section 206 may change automatically to indicate the change.

Aspects of the table 880 not shown in view 800 may be identical to the table 580 in view 500.

Figure 9:
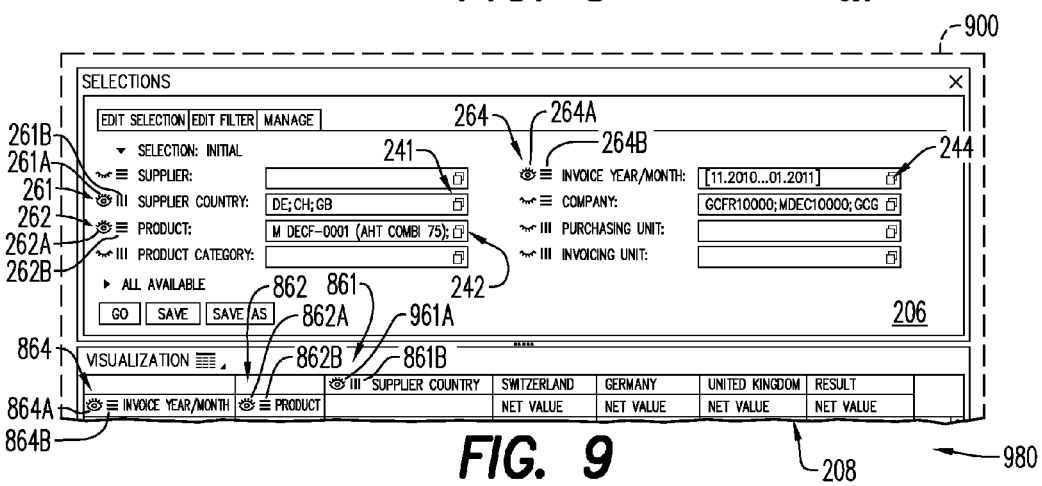
FIG. 9 is a portion of a view in a user interface, in accordance with some embodiments.

FIG. 9 is a portion of a view 900 in a graphical user interface, showing a second embodiment of the switch controls in the visualization section 208, in accordance with some embodiments. Referring to FIG. 9, in some embodiments, each of the switch controls in the visualization section 208, e.g., 861, 862 and 864, includes two switches. For example, a first switch control 861 may have switches 861A-861B. And so on. Each of the one or more switch controls in the visualization section 208, e.g., 861, 862 and 864, may operate and/or may be operated in a manner that is the same and/or similar to the manner of operation of the switch controls, e.g., 260-267, in the view 600.

Figure 10:
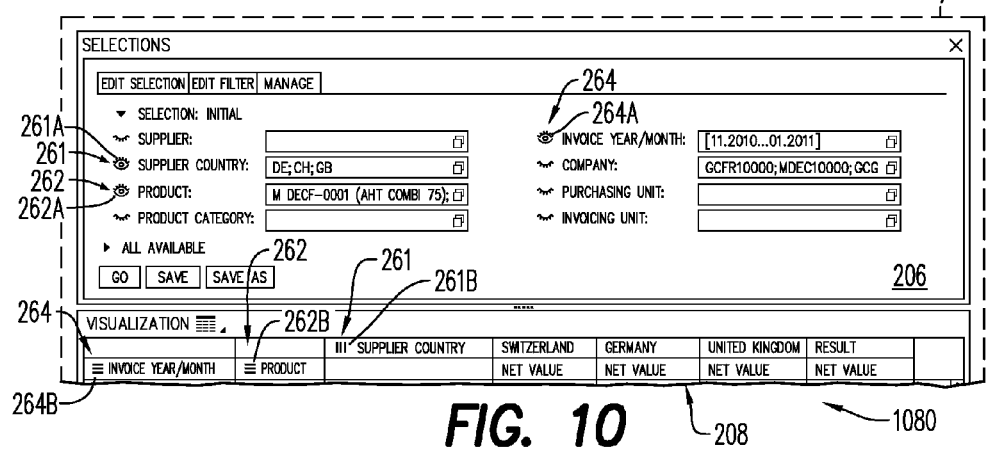
FIG. 10 is a portion of a view in a user interface, in accordance with some embodiments.

FIG. 10 is a portion of a view 1000 in a graphical user interface, showing another embodiment of the selection section 206 and visualization section 208. In this embodiment, each of the switch controls, e.g., 261, 262, 264, includes two switches. The first switch, e.g., 261A, 262A, 264A, of each switch control is disposed in the selection section 206. The second switch, e.g., 261B, 262B, 264B, of each switch control is disposed in the visualization section 208. In some embodiments, the second switch of each switch control is shown only if the first switch of the switch control indicates that values for the respective attribute are to be shown in a report. Each of the switch controls may otherwise be operated in a manner that is the same and/or similar to the manner of operation of the switch controls, e.g., 260-267, in the view 600.

FIG. 11 is a portion of a view 1100 showing another embodiment of the selection section 206 and visualization section 208. Referring to FIG. 11, in accordance with some embodiments, the selection section 206 may include a graphical tool 1140 that shows a list of all attributes (e.g., by a name or other identifier) within the system. A user may select (or deselect) one or more of the attributes in the list to define a set of attributes based upon which to filter. Selection of an attribute in the list may activate a graphical tool associated with the attribute. In the illustrated embodiment, the attributes SUPPLIER COUNTRY and INVOICE YEAR/MONTH are selected and the graphical tools 241 and 244 are activated (e.g., popped up). Graphical tools 241 and 244 list all possible values (in the system) for attributes SUPPLIER COUNTRY and INVOICE YEAR/MONTH, respectively. A user may select (or deselect) one or more of the values in each list to define the set of values of each attribute that satisfy filter criteria.

Graphical tools 241 and 244 may include the switch controls 261 and 264, respectively, each of which may be associated with a respective one of the attributes SUPPLIER COUNTRY and INVOICE YEAR/MONTH. In some embodiments, the operation and/or use of switch controls 261 and 264 is the same as and/or similar to the operation and/or use of the switch controls 261 and 264 in view 200.

In the illustrated embodiment, the switch control 261 indicates that the selected values for respective attribute, e.g., SUPPLIER COUNTRY, should be shown as rows. The switch control 264 indicates that selected values for respective attribute, e.g., INVOICE YEAR/MONTH, should be shown as columns.

A report may be generated based at least in part on filter criteria and the presentation criteria for each attribute. In the illustrated embodiment, two visualizations are generated. A first visualization comprises a table 1180 having a plurality of columns, e.g., 1181-1183, each of which has a plurality of rows, e.g., 1184-1190. The selected values of the attribute SUPPLIER COUNTRY are shown as rows. The selected values of the attribute INVOICE YEAR/MONTH are shown as columns.

A second visualization comprises a bar graph 1191 having a first axis extending in a first (e.g., horizontal) dimension and a second axis extending in a second (vertical) dimension. Since a bar graph does not have rows and columns, the presentation criteria "show as rows" and "show as columns" may be converted to other presentation criteria for purposes of the bar graph 1191. In some embodiments, the presentation criteria "show as rows" and the presentation criteria "show as columns" are each converted to the presentation criteria "space the selected values from one another in the horizontal dimension". In some embodiments, priority may be given to the selected values of one of the attributes. Such values may be shown on the x-axis.

In accordance with the converted presentation criteria, the selected values of the attribute SUPPLIER COUNTRY are shown spaced from one another in the horizontal dimension. The selected values of the attribute INVOICE YEAR/MONTH are also shown spaced from one another in the horizontal dimension. The selected values of the attribute SUPPLIER COUNTRY may be given priority over the selected values of the attribute INVOICE YEAR/MONTH and are shown on the x-axis. The selected values of the attribute INVOICE YEAR/MONTH are cycled for each of the selected values of the attribute SUPPLIER COUNTRY. Thus, a first bar 1192 in the bar graph is associated with the value Australia and the value December 2010. A second bar 1193 in the bar graph is associated with the value Australia and the value January 2011. A third bar 1194 in the bar graph is associated with the value Switzerland and the value December 2010. A fourth bar 1195 is associated with the value Switzerland and the value January 2011. And so on.

Figure 12:
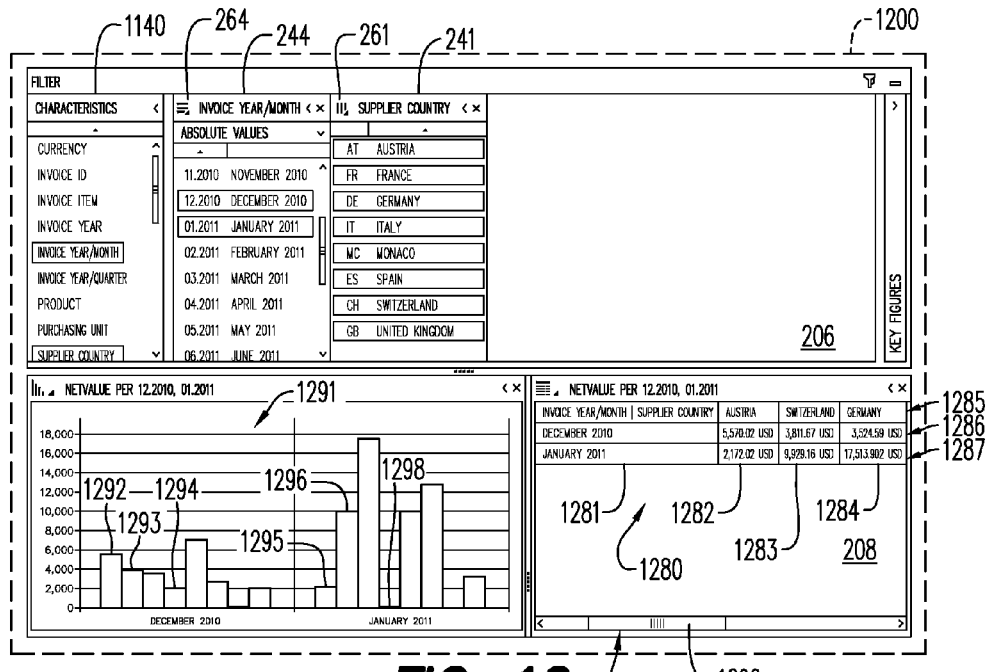

FIG. 12 is a portion of a view 300 in a graphical user interface, which may be provided after a change to the presentation criteria shown in the view 1100. The state of switch control 261 is now "show as columns". The state of switch control 264 is now "show as rows". A new table 1280, which may have a plurality of columns, e.g., columns 1281-1284, each of which may have one or more rows, is shown. The selected values of the attribute SUPPLIER COUNTRY are now shown as columns. The selected values of the attribute INVOICE YEAR/MONTH are now shown as rows.

A new bar graph 1291 is also shown. In accordance with the converted criteria, the selected values of the attribute SUPPLIER COUNTRY are shown spaced from one another in the horizontal dimension. The selected values of the attribute INVOICE YEAR/MONTH are also shown spaced from one another in the horizontal dimension.

However, in this case, the selected values of the attribute INVOICE YEAR/MONTH are given priority over the selected values of the attribute SUPPLIER COUNTRY and are shown on the x-axis. The selected values of the attribute SUPPLIER COUNTRY are cycled for each of the selected values of the attribute INVOICE YEAR/MONTH. For example, a first bar 1292 is associated with the value December 2010 and the value Australia. A second bar 1293 is associated with the value December 2010 and the value Switzerland. A fourth bar 1294 is associated with the value December 2010 and the value Spain. And so on. A ninth bar 1295 is associated with the value January 2011 and the value Australia. A tenth bar 1296 is associated with the value January 2011 and the value Switzerland. A twelfth bar 1298 is associated with the value January 2011 and the value Spain. And so on.

Figure 13:
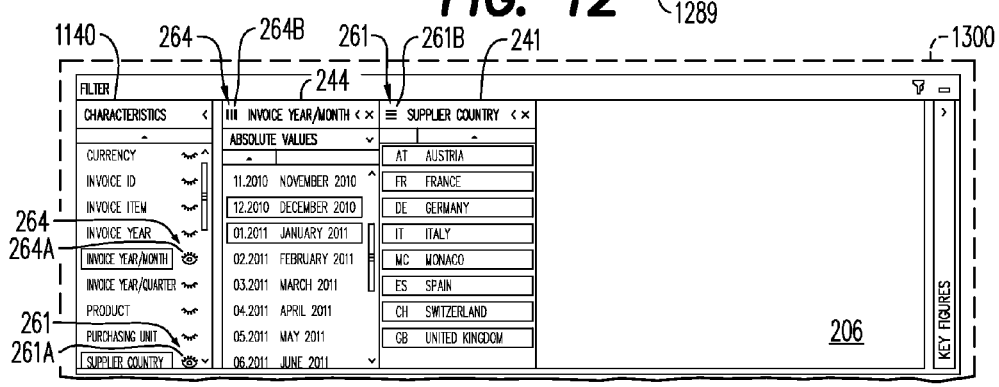
FIG. 13 is a portion of a view in a user interface, in accordance with some embodiments.

FIG. 13 is a portion of a view 1300 in a graphical user interface, showing another embodiment of the selection section 206. In this embodiment, each of the switch controls, e.g., 261, 264, includes two switches. The first switch, e.g., 261A, 264A, of each switch control, e.g., 261, 264, is disposed in the graphical tool 1140. The second switch, e.g., 261B, 264B, of each switch control, e.g., 261, 264, is disposed in a respective graphical tool 241, 244. In some embodiments, the second switch of each switch control is shown only if the first switch of the switch control indicates that values for the respective attribute are to be shown in a report. Each of the switch controls may otherwise be operated in a manner that is the same and/or similar to the manner of operation of the switch controls, e.g., 260-267, in the view 600. The table and the bar chart in view 1300 may be identical to the table and bar chart in view 1100.

Figure 14A:
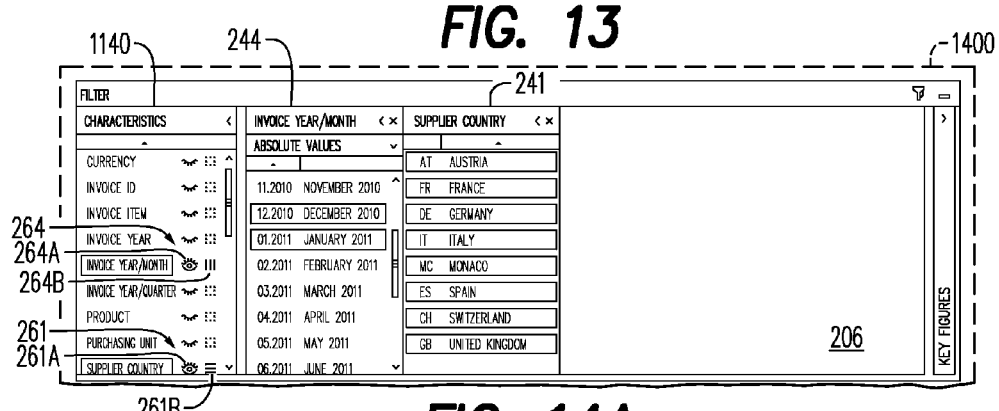
FIG. 14A is a portion of a view in a user interface, in accordance with some embodiments.

FIG. 14A is a portion of a view 1400 in a graphical user interface, showing another embodiment of the selection section 206. In this embodiment, each of the switch controls, e.g., 261, 264, includes two switches. The first switch, e.g., 261A, 264A, and the second switch, e.g., 261B, 264B, of each switch control, e.g., 261, 264, is disposed in the graphical tool 1140. Each of the switch controls may operate and/or may be operated in a manner that is the same and/or similar to the manner of operation of the switch controls, e.g., 260-267, in the view 600. The table and the bar chart in view 1400 may be identical to the table and the bar chart in view 1100.

FIG. 14B is a representation of a portion of a view in a graphical user interface, showing another embodiment of the graphical tool 1140 and switch controls, e.g., 261, 264, in selection section 206. In some embodiment, each of the switch controls, e.g., 261, 264, may be the same as and/or similar to the switch controls, e.g., 260-267, in the view 200.

As stated above with respect to view 200, in some embodiments, priority may be given to selected values of one attribute, e.g., COMPANY, which may be shown as rows (or columns) over the selected values of another attribute, e.g., SUPPLIER COUNTRY, which may also be shown as rows (or columns).

Figure 15:
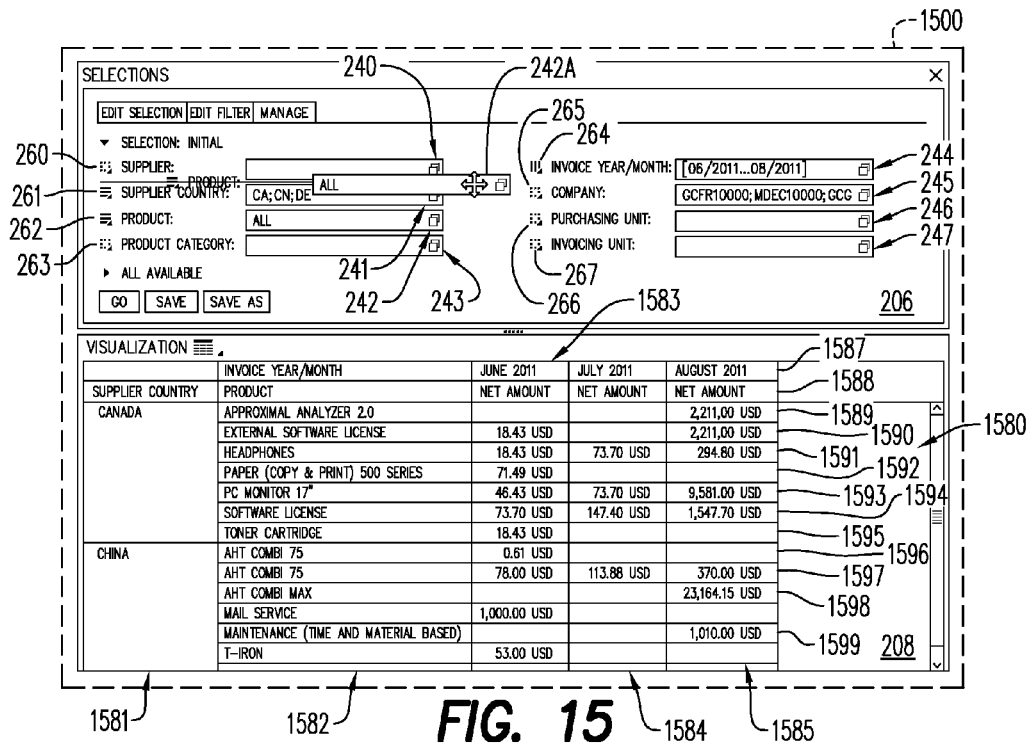
FIGS. 15-16 are portions of views in a user interface, in accordance with some embodiments.
Figure 16:
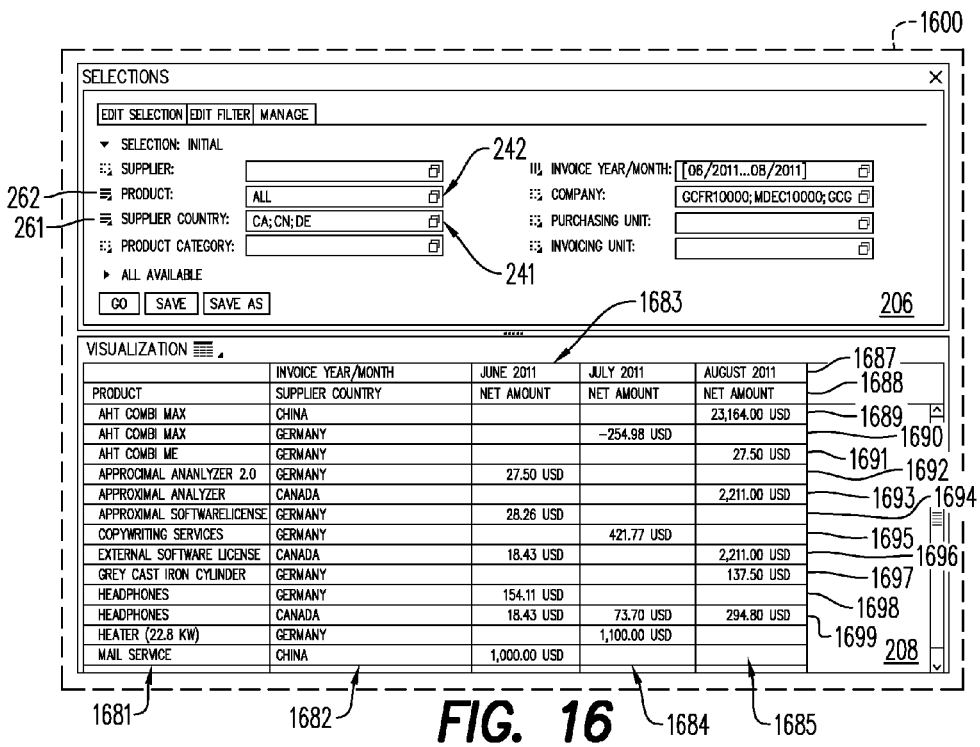

FIGS. 15-16 are portions of views 1500, 1600 in a user interface, showing a priority and an adjustment to a priority, in accordance with some embodiments. Referring to FIG. 15, in accordance with some embodiments, the presentation criteria for the selected values of the attribute SUPPLIER COUNTRY and the selected values of attribute PRODUCT are each "show as rows". In table 1580 (which has a plurality of columns, e.g., 1581-1585, each of which has a plurality of rows, e.g., 1587-1599), the selected values of one of the above attributes may be given priority over the other.

In some embodiments, the priority may be determined based at least in part on an arrangement of one or more graphical tools in the view 1500. In some embodiments, the priority is determined based at least in part on the arrangement of graphical tools, e.g., 241, 242. In some embodiments, the priority is determined based at least in part on which of the graphical tools, e.g., 241, 242, is prior to the other. This may be based at least in part on the arrangement of the graphical tools 241, 242 and a rule for determining order based on the arrangement.

For purposes of discussion, it may be assumed that the graphical tool 241 associated with the attribute SUPPLIER COUNTRY is determined to be prior to the graphical tool 242 associated with the attribute PRODUCT. As a result, the selected values of the attribute SUPPLIER COUNTRY are given priority in table 1580.

As indicated at 242A, the arrangement may be adjustable. In some embodiments, a user adjusts the position of the graphical tool 242 associated with the attribute PRODUCT relative to the position of the graphical tool 241 associated with the attribute SUPPLIER COUNTRY. In some embodiments, the adjustment is made using drag and drop or another technique.

FIG. 16 is a portion of a view 1600, after the adjustment, in accordance with some embodiments. Referring to FIG. 16, the selected values of the attribute PRODUCT are now given priority in the table 1680 (which has a plurality of columns, e.g., 1681-1685, each of which has a plurality of rows, e.g., 1687-1699).

Some embodiments may use a different rule for determining order based on the arrangement of the graphical tools 240-247. For example, a different rule may have been used in the embodiment shown in the view 200. Had the embodiment shown in the view 200 used the same rule as used in FIGS. 15-16, priority may have been given to selected values of the attribute SUPPLIER COUNTRY, which may be shown as rows (or columns) over the selected values of the attribute COMPANY which may also be shown as rows (or columns).

Figure 17:
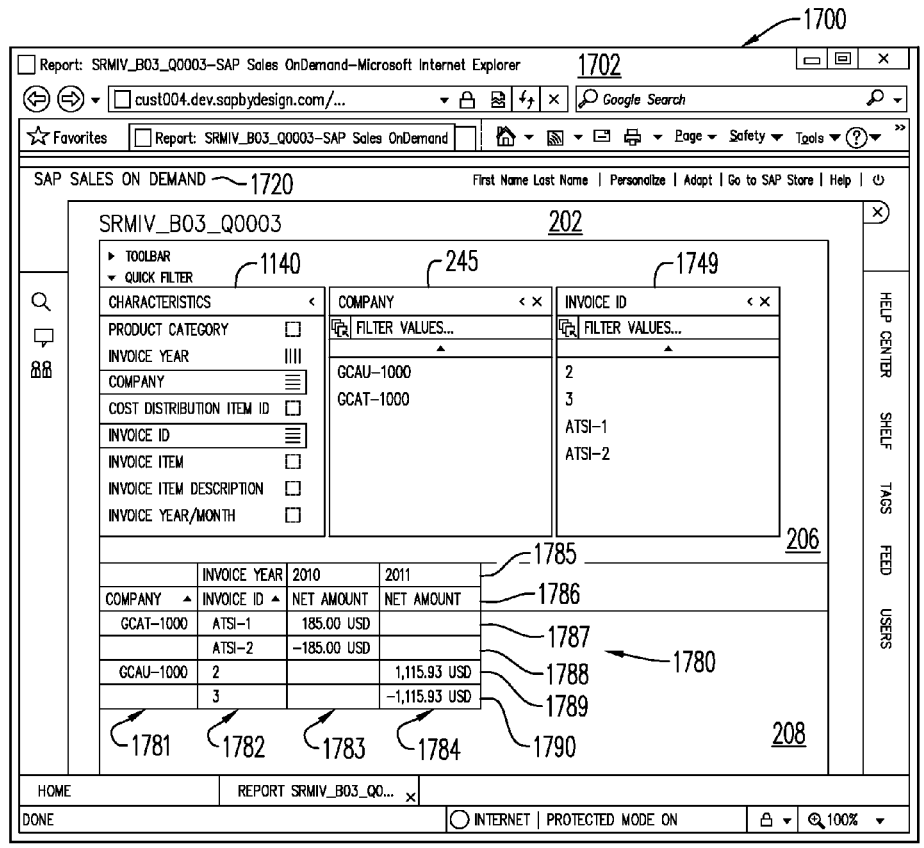
FIGS. 17-18 are views in a user interface, in accordance with some embodiments.
Figure 18:
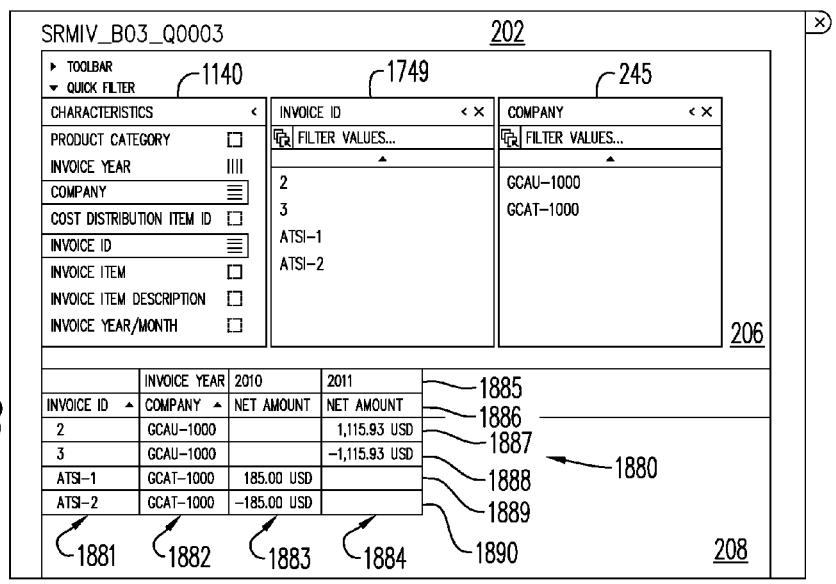

FIGS. 17-18 are views 1700, 1800 in a user interface, showing another embodiment of priority and adjustment to priority, accordance to some embodiments. Referring to FIG. 17, the presentation criteria for the selected values of the attribute COMPANY and the selected values of attribute INVOICE ID are each "show as rows".

In some embodiments, a priority is determined based at least in part on which of the graphical tools, e.g., 245, 1749, is prior to the other. For purposes of discussion, it may be assumed that the graphical tool 245 associated with the attribute COMPANY is prior to the other. Thus, the selected values of the attribute COMPANY are given priority in the table 1780 (which has a plurality of columns, e.g., 1781-1784, and a plurality of rows, e.g., 1785-1790).

FIG. 18 is a portion of a view 1800 in a user interface, after an adjustment to the arrangement in the view 1700, in accordance with some embodiments. In some embodiments, the adjustment is made using drag and drop or another technique. Referring to FIG. 18, the graphical tool 1749 associated with the attribute INVOICE ID is now prior to the other. As a result, the selected values of the attribute COMPANY are given priority in the table 1880 (which has a plurality of columns, e.g., 1881-1884, and a plurality of rows, e.g., 1885-1890).

In some embodiments, priority may not be determined based on the arrangement of the graphical tools 240-247, but rather may be determined in some other manner. In some embodiments, a tool in the selection section 206 and/or any of the views disclosed herein may be activated to open a pop up that lists some or all of the attributes (or at least the attributes for which values are to be shown in the report) and allows a user to drag and drop the attributes that are listed in the pop up to arrange the attributes in an order that defines a priority of the attributes.

FIG. 19A is flow chart of a method 1900, in accordance with some embodiments. In some embodiments, one or more portions of the method are performed by one or more user devices, e.g., 122-126. In some embodiments, one or more portions of the method result from a processor executing a program within one or more of the user devices.

Referring to FIG. 19A, at 1902, the method may include providing a graphical user interface that includes a view. The view may include a selection area that includes identifiers associated with a plurality of attributes, each of the plurality of attributes having a plurality of possible values. The selection area may further include one or more graphical tools to define filter criteria based at least in part on selected ones of the plurality of possible values of one or more of the plurality of attributes. The view may further include one or more switch controls each being associated with a respective one of the one or more of the plurality of attributes and indicating presentation criteria including: whether selected ones of the possible values of the respective attribute are to be shown in a report, and a dimension of the report in which to space the selected ones of the possible values from one another if the selected ones of the possible values are to be shown in the report.

At 1904, the method may further include receiving data that satisfies the filter criteria. At 1906, the method may further include generating the report based at least in part on the data that satisfies the filter criteria and on the respective presentation criteria indicated by each of the plurality of switch controls.

Embodiments of any method described herein may be performed in any order practicable. Some embodiments may employ one or more portions of any method described herein without one or more other portions of such. In some embodiments, any method described herein may be performed using hardware, software and/or combinations thereof. In some embodiments, a non-transitory storage medium may store instructions that when executed by a machine result in one or more portions of the method.

FIG. 19B is a block diagram of a portion of a processing system, in accordance with some embodiments. Referring to FIG. 19B, a processing system 1950 may include a user interface 1952 (with a view including tools to define filter criteria and switch controls to define presentation criteria), a report generator 1954 and a database 1956. The report generator 1954 may receive the filter criteria and presentation criteria from the user interface 1952. The report generator 1954 may query a database (e.g., database 1956 and/or database 112) based on the filter criteria, receive data that satisfies the filter criteria, and generate generating a report based at least in part on the data and on the presentation criteria. In some embodiments, one or more of the methods (or portion(s) thereof) disclosed herein may be performed by the portion of the processing system.

FIG. 20 is a block diagram of processing system 2000 according to some embodiments. In some embodiments, one or more of the systems, apparatus and/or devices (or portion(s) thereof) disclosed herein may have an architecture that is the same as or similar to the architecture of the processing system 2000 (or portion(s) thereof). In some embodiments, one or more of the methods (or portion(s) thereof) disclosed herein may be performed by a system, apparatus and/or device having an architecture that is the same as or similar to the architecture of processing system 2000 (or portion(s) thereof).

Referring to FIG. 20, in accordance with some embodiments, the processing system 2000 includes a processor 2001 coupled to a communication device 2002, an input device 2003, an output device 2004 and a storage device 2006.

The processor 2001 may execute processor-executable program code to provide or otherwise result in one or more portions of one or more functions and/or one or more portions of one or more methods disclosed herein. In some embodiments, the processor 2001 may comprise one or more INTEL® Pentium® processors.

The communication device 2002 may be used to facilitate communication with other devices and/or systems. In some embodiments, communication device 2002 may comprise an Ethernet and/or other type of connection to a network and/or resource and through which processing system 2000 may receive and/or transmit information.

The input device 2003 may be used to input information. In some embodiments, the input device 2003 may comprise a keyboard, a keypad, a track ball, a touchpad, a mouse or other pointing device, a microphone, a knob or a switch, an infrared (IR) port and/or a computer media reader. The output device 2004 may be used to output information. In some embodiments, the output device 2004 may comprise an IR port, a docking station, a display, a speaker and/or a printer.

The storage device 2006 may store one or more programs 2010-2012 and/or other information for operation of the processing system 2000. In some embodiments, the one or more programs and/or other information include one or more operating systems, one or more database management systems and/or other applications for operation of the processing system 2000. In some embodiments, the one or more programs 2010-2012 include one or more instructions to be executed by the processor 2001 to provide one or more portions of one or more functions and/or one or more portions of one or more methods disclosed herein. In some embodiments, the one or more programs and/or other information include one or more databases 2014-2016. In some embodiments, the storage device 2006 comprises one or more storage devices, for example, magnetic storage devices (e.g., magnetic tape and/or hard disk drives), optical storage devices, and/or semiconductor memory devices such as RAM and/or ROM devices.

Unless stated otherwise, a processing system may comprise any type of processing system. A processing system may include, but is not limited to, hardware, software, firmware, and/or any combination thereof. Hardware may include, but is not limited to off the shelf integrated circuits, custom integrated circuits and/or any combination thereof Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. In some embodiments, a processing system executes instructions stored on a computer readable medium. In some embodiments, a processing system comprises at least one processor. In some embodiments, a processing system employs continuous signals, periodically sampled signals, and/or any combination thereof. If a processing system is distributed, two or more portions of the processing system may communicate with one another through one or more communication links.

Unless stated otherwise, a processor may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. In some embodiments, a processor comprises a microprocessor. In some embodiments, a processor may execute instructions stored on the computer readable medium. A processor may employ continuous signals, periodically sampled signals, and/or any combination thereof. If a processor is distributed, two or more portions of the processor may communicate with one another through one or more communication links.

Unless stated otherwise, a communication link may comprise any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols.

Unless stated otherwise, data may comprise any type of information.

Unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Unless stated otherwise, terms such as, for example, "in response to", "in accordance with" and "based on" mean "in response at least to" "in accordance at least with" and "based at least on", respectively, so as not to preclude being responsive to, in accordance with and/or based on, more than one thing.

While various embodiments have been described, such description should not be interpreted in a limiting sense. It is to be understood that other embodiments may be practiced without departing from the spirit and scope of the invention, as recited in the claims appended hereto.

What is claimed is:

1. A method comprising:
   providing a graphical user interface including a view, the view including:
      a selection area, the selection area including identifiers associated with a plurality of attributes, each of the plurality of attributes having a plurality of possible values, the selection area further including one or more graphical tools to define filter criteria based at least in part on selected ones of the plurality of possible values of one or more of the plurality of attributes; and
      one or more switch controls each being associated with a respective one of the one or more of the plurality of attributes and indicating presentation criteria including:
         whether selected ones of the possible values of the respective attribute are to be shown in a report, and
         a dimension of the report in which to space the selected ones of the possible values from one another if the selected ones of the possible values are to be shown in the report;
   receiving data that satisfies the filter criteria; and
   generating the report based at least in part on the data that satisfies the filter criteria and on the presentation criteria indicated by the one or more switch controls;
   wherein each of the one or more switch controls comprises a tri-state switch; and
   wherein each one of the one or more switch controls displays: (i) a first symbol at a location associated with the one of the one or more switch controls to indicate that the tri-state switch of the one of the one or more switch controls is in a first state, (ii) a second symbol at the location to indicate that the tri-state switch of the one of the one or more switch controls is in a second state different than the first state and (iii) a third symbol at the location to indicate that the tri-state switch of the one of the one or more switch controls is in a third state different than the first state and the second state.

2. The method of claim 1 wherein the tri-state switch of a first one of the switch controls is a first tri-state switch and wherein the generating the report comprises:
   generating a table having a plurality of columns each having a plurality of rows; and
   showing each of the selected ones of the possible values of the attribute associated with the first one of the switch controls in a respective one of the columns if the fist tri-state switch is in a first state, showing each of the selected ones of the possible values of the attribute associated with the first one of the switch controls in a respective one of the rows if the first tri-state switch is in a second state; and not showing the selected ones of the possible values of the attribute associated with the first one of the switch controls in the table if the first tri-state switch is in a third state.

3. The method of claim 1 wherein the view includes a plurality of graphical tools disposed in a user adjustable arrangement; and
   wherein the generating the report comprises:
      generating the report based at least in part on the data that satisfies the filter criteria, the presentation criteria indicated by the one or more switch controls and the user adjustable arrangement.

4. The method of claim 1 further comprising providing the report in the view.

5. The method of claim 1 wherein the one or more graphical tools to define the filter criteria based at least in part on selected ones of the plurality of possible values of one or more of the plurality of attributes comprise:
   a first graphical tool associated with a first one of the one or more of the plurality of attributes to allow a user to select one or more of the plurality of possible values of the first one of the attributes; and
   a second graphical tool associated with a second one of the one or more of the plurality of attributes to allow a user to select one or more of the plurality of possible values of the second one of the attributes;
   wherein the first graphical tool that is to allow a user to select one or more of the plurality of possible values of the first one of the attributes is disposed at a first position in the view;
   wherein the second graphical tool that is to allow a user to select one or more of the plurality of possible values of the second one of the attributes is disposed at a second position in the view; and wherein the generating the report comprises:
generating the report based at least in part on: (i) the data that satisfies the filter criteria, (ii) the presentation criteria indicated by the one or more switch controls and (iii) the position of the first graphical tool that is to allow a user to select one or more of the plurality of possible values of the first one of the attributes relative to the position of the second graphical tool that is to allow a user to select one or more of the plurality of possible values of the second one of the attributes.

6. The method of claim 5 further comprising:
receiving user input via the graphical user input;
in response to the user input received via the view in the graphical user input; adjusting the position of the first graphical tool that is to allow a user to select one or more of the plurality of possible values of the first one of the attributes relative to the position of the second graphical tool that is to allow a user to select one or more of the plurality of possible values of the second one of the attributes; and
re-generating the report based at least in part on: (i) the data that satisfies the filter criteria, (ii) the presentation criteria indicated by the one or more switch controls and (iii) the adjusted position of the first graphical tool that is to allow a user to select one or more of the plurality of possible values of the first one of the attributes relative to the position of the second graphical tool that is to allow a user to select one or more of the plurality of possible values of the second one of the attributes.

7. The method of claim 1 wherein each one of the one or more switch controls has only three possible states.

8. The method of claim 7 wherein each one of the one or more switch controls allows a user to change its state by performing an action on the one of the one or more switch controls.

9. The method of claim 8 wherein a first mouse click by a user causes the one of the one or more switch controls to transition from a first one of the three possible states, a second mouse click by a user causes the one of the one or more switch controls to transition again, and a third mouse click by a user causes the one of the one or more switch controls to return to the first one of the three possible states.

10. The method of claim 7 wherein each one of the one or more switch controls is activatable to open a pop up that shows a list of the three possible states.

11. A non transitory computer readable storage medium having instructions stored thereon, the instructions being executable by a machine to result in a method comprising:
providing a graphical user interface including a view, the view including:
a selection area, the selection area including identifiers associated with a plurality of attributes, each of the plurality of attributes having a plurality of possible values, the selection area further including one or more graphical tools to define filter criteria based at least in part on selected ones of the plurality of possible values of one or more of the plurality of attributes; and
one or more switch controls each being associated with a respective one of the one or more of the plurality of attributes and indicating presentation criteria including:
whether selected ones of the possible values of the respective attribute are to be shown in a report, and
a dimension of the report in which to space the selected ones of the possible values from one another if the selected ones of the possible values are to be shown in the report;
receiving data that satisfies the filter criteria; and
generating the report based at least in part on the data that satisfies the filter criteria and on the presentation criteria indicated by the one or more switch controls;
wherein each of the one or more switch controls comprises a tri-state switch; and
wherein each one of the one or more switch controls displays: (i) a first symbol at a location associated with the one of the one or more switch controls to indicate that the tri-state switch of the one of the one or more switch controls is in a first state, (ii) a second symbol at the location to indicate that the tri-state switch of the one of the one or more switch controls is in a second state different than the first state and (iii) a third symbol at the location to indicate that the tri-state switch of the one of the one or more switch controls is in a third state different than the first state and the second state.

12. The computer readable medium of claim 11 wherein the tri-state switch of a first one of the switch controls is a first tri-state switch and wherein the generating the report comprises:
generating a table having a plurality of columns each having a plurality of rows; and
showing each of the selected ones of the possible values of the attribute associated with the first one of the switch controls in a respective one of the columns if the fist tri-state switch is in a first state, showing each of the selected ones of the possible values of the attribute associated with the first one of the switch controls in a respective one of the rows if the first tri-state switch is in a second state; and not showing the selected ones of the possible values of the attribute associated with the first one of the switch controls in the table if the first tri-state switch is in a third state.

13. The computer readable medium of claim 11 wherein the view includes a plurality of graphical tools disposed in a user adjustable arrangement; and
wherein the generating the report comprises:
generating the report based at least in part on the data that satisfies the filter criteria, the presentation criteria indicated by the one or more switch controls and the user adjustable arrangement.

14. The computer readable medium of claim 11, the method further comprising providing the report in the view.

15. Apparatus comprising:
a processing system including a processor and to:
provide a graphical user interface including a view, the view including:
a selection area, the selection area including identifiers associated with a plurality of attributes, each of the plurality of attributes having a plurality of possible values, the selection area further including one or more graphical tools to define filter criteria based at least in part on selected ones of the plurality of possible values of one or more of the plurality of attributes; and
one or more switch controls each being associated with a respective one of the one or more of the plurality of attributes and indicating presentation criteria including:
whether selected ones of the possible values of the respective attribute are to be shown in a report, and
a dimension of the report in which to space the selected ones of the possible values from one another if the selected ones of the possible values are to be shown in the report;

receive data that satisfies the filter criteria; and generate the report based at least in part on the data that satisfies the filter criteria and on the presentation criteria indicated by the one or more switch controls;

wherein each of the one or more switch controls comprises a tri-state switch; and wherein each one of the one or more switch controls displays: (i) a first symbol at a location associated with the one of the one or more switch controls to indicate that the tri-state switch of the one of the one or more switch controls is in a first state, (ii) a second symbol at the location to indicate that the tri-state switch of the one of the one or more switch controls is in a second state different than the first state and (iii) a third symbol at the location to indicate that the tri-state switch of the one of the one or more switch controls is in a third state different than the first state and the second state.

16. The apparatus of claim 15 wherein the tri-state switch of a first one of the switch controls is a first tri-state switch and wherein generation of the report comprises:

generating a table having a plurality of columns each having a plurality of rows; and showing each of the selected ones of the possible values of the attribute associated with the first one of the switch controls in a respective one of the columns if the fist tri-state switch is in a first state, showing each of the selected ones of the possible values of the attribute associated with the first one of the switch controls in a respective one of the rows if the first tri-state switch is in a second state; and not showing the selected ones of the possible values of the attribute associated with the first one of the switch controls in the table if the first tri-state switch is in a third state.

17. The apparatus of claim 15 wherein the view includes a plurality of graphical tools disposed in a user adjustable arrangement; and wherein the generating the report comprises:

generating the report based at least in part on the data that satisfies the filter criteria, the presentation criteria indicated by the one or more switch controls and the user adjustable arrangement.

18. The apparatus of claim 15, the processing system further to:

provide the report in the view.

* * * * *